United States Patent [19]

Rainbolt

[11] Patent Number: 5,483,538
[45] Date of Patent: Jan. 9, 1996

[54] AUDIO FRAME SYNCHRONIZATION FOR EMBEDDED AUDIO DEMULTIPLEXERS

[75] Inventor: Joe L. Rainbolt, Rough & Ready, Calif.

[73] Assignee: The Grass Valley Group, Inc., Nevada City, Calif.

[21] Appl. No.: 248,795

[22] Filed: May 25, 1994

[51] Int. Cl.$^6$ .............................. H04J 3/06; H04N 7/08
[52] U.S. Cl. .................... 370/100.1; 370/105.1; 348/513; 348/526
[58] Field of Search ............................ 370/100.1, 105.1; 375/354, 355; 348/500, 512, 513, 515, 521, 524, 526

[56] References Cited

U.S. PATENT DOCUMENTS 5,351,090  9/1994  Nakamura ........................ 348/484
5,396,497  3/1995  Veltman ........................... 370/100.1

*Primary Examiner*—Melvin Marcelo
*Attorney, Agent, or Firm*—Francis I. Gray

[57] ABSTRACT

Audio frame synchronization for embedded audio demultiplexers counts the number of audio samples for each video frame of a digital video signal. The pattern of audio samples per video frame for an audio frame is detected to identify an audio frame boundary, the pattern being a function of the respective video and audio standards for the digital video signal. For example in one embodiment the number of audio samples for consecutive video frames are compared, and when there is equality between consecutive video frames the audio frame boundary is detected.

12 Claims, 3 Drawing Sheets

AUDIO FRAME SYNCHRONIZATION FOR EMBEDDED AUDIO DEMULTIPLEXERS

BACKGROUND OF THE INVENTION

The present invention relates to signal synchronization, and more particularly to audio frame synchronization for embedded audio demultiplexers that detects the boundary between audio frames to synchronize the embedded audio with the video.

Multiple channels of digital audio may be multiplexed with a digital video signal during the inactive period between the end of active video for one line (EAV) and the start of active video for the next line (SAV) for component video, or during the horizontal and vertical intervals for composite video, so that the combined signal is transmitted over a single video cable. At the receive end of the video cable the video and individual audio signals are separated by a demultiplexer. A proposed Society of Motion Picture and Television Engineers (SMPTE) standard 259M, "Formatting AES/EBU Audio and AES/EBU Auxiliary Data into Digital Video Ancillary Data Space", describes the number of digital audio samples from each audio channel per video frame in order to maintain a desired audio sample rate at the receive end of the video cable. When the audio sample rate is not an integer multiple of the video frame rate, several video frames may elapse before an integer number of audio samples coincides with a video frame boundary. The number of video frames required to match an integer number of audio samples at a given sample rate is called an audio frame.

Demultiplexers currently have no way of determining the phase of the audio frame. Consequently the demultiplexers randomly select a phase before beginning to demultiplex the embedded audio signal. Different demultiplexers select different audio frame phases, resulting in differing audio phases at their outputs. The phase shift due to audio frame misalignment may exceed two audio samples between separate demultiplexers. For example with an audio sample rate of 48 kHz the time difference between two misaligned audio channels is 20.83 microseconds per sample of difference. This time difference is quite small and not likely to be heard directly when the error is due to unsynchronized audio frames with an error of one to two samples. However the problem becomes apparent when two or more misaligned channels are mixed together. Therefore if two channels are mixed that contain some audio that is common to both channels and some audio that is different in each channel, which would happen with a stereo microphone setup, the phase difference due to the audio frame misalignment causes distortion in those audio components that are common to both channels. The problem is more acute at higher frequencies where the misalignment represents a higher percentage of the frequency's period. A two sample shift between the channels causes frequencies near 12 kHz to cancel almost entirely. Thus the effects of mixing misaligned channels may range from small phase changes to complete cancellation of some audio frequencies.

What is desired is a demultiplexer that provides audio frame synchronization in a demultiplexer to align an audio frame representing embedded audio data with video.

SUMMARY OF THE INVENTION

Accordingly the present invention provides audio frame synchronization for embedded audio with video in demultiplexers. The audio data is separated from the video data in a serial digital video signal and is stored in a memory at video sample rates. The pattern of audio samples per video frame within an audio frame is detected to generate an audio frame signal that provides phasing information for the audio data. The audio data is read out from the memory and transmitted at audio sample rates. For a specific pattern, determined by the video and audio standards for the serial digital video signal, an audio frame boundary is determined by two consecutive video frames having the same number of audio samples. Therefore the pattern detection requires counting the number of audio samples per video frame, comparing the number of audio samples between consecutive video frames, and generating an audio frame signal when equality is detected.

The objects, advantages and other novel features of the present invention are apparent from the following detailed description when read in conjunction with the appended claims and attached drawing.

DESCRIPTION OF THE PREFERRED EMBODIMENT

Figure 1:
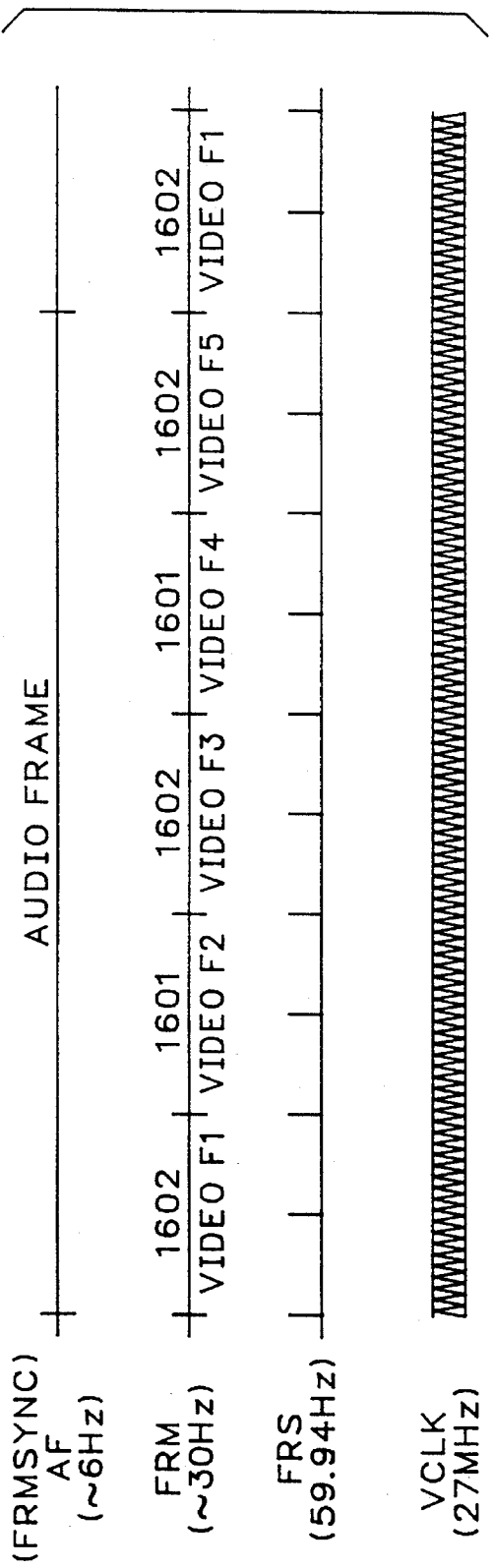
FIG. 1 is an illustration of the relationship between an audio frame and video frames including some timing signals according to the present invention.

The present invention is described with respect to an audio sample rate of 48 kHz and a video field rate of 59.94 Hz (525 line component or composite video). The audio frame in this case repeats every five video frames, i.e., there are a total of 8008 audio samples per every five video frames. Referring now to FIG. 1 the audio samples are broken into groups of either 1601 or 1602 samples per video frame, the actual average number of audio samples per video frame being 1601.6. The audio frame has the number of audio samples per video frame alternating between the two groups, starting and ending with a group of 1602 samples. Therefore to detect the boundary between audio frames the audio samples in each video frame are counted and compared with the result for the previous video frame. Since the start and end video frames within the audio frame have the same number of audio samples, when two consecutive video frames have the identical number of audio samples the audio frame boundary is detected.

More generically the number of video frames required per audio frame is a function of the specific video and audio standards, i.e., the respective sample rates. Depending upon the particular standards a pattern of audio samples per video frame within the audio frame is established. The number of audio samples per video field are counted and the particular established pattern is detected to detect the boundary of the audio frame. In the specific example referred to above the pattern detection is achieved by finding two video frames with the same number of audio samples.

Figure 2:
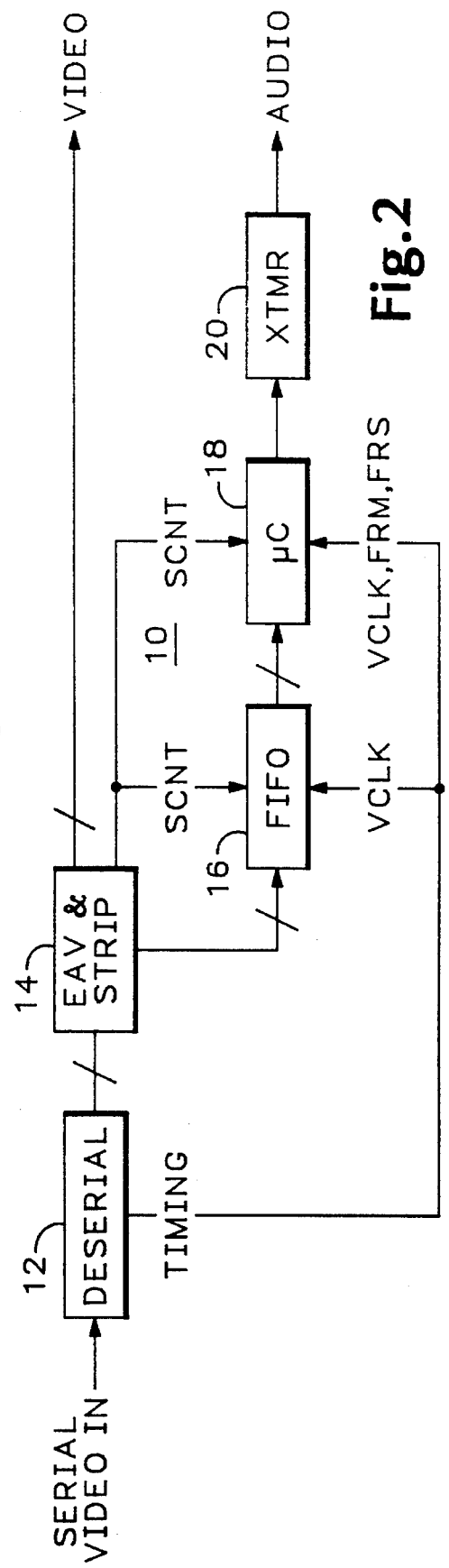
FIG. 2 is a block diagram for a demultiplexer according to the present invention.

Referring now to FIG. 2 a demultiplexer 10 is shown for component video. An input serial digital video signal having an embedded digital audio signal is input to a deserializer 12 that converts the serial signal into n-bit parallel data words and provides timing signals derived from the input serial digital video signal. An EAV detector and audio extractor circuit 14 detects the EAV words for each line of video data and strips the audio data words from the parallel data words during the interval between EAV and SAV. For a composite video demultiplexer the EAV detector and audio extractor circuit 14 becomes a sync detector and audio extractor circuit for identifying the horizontal and vertical sync intervals and extracting the digital audio data words from those intervals. The detector/extractor 14 generates an enable signal during the EAV-SAV interval, or during the horizontal or vertical sync interval. The digital signal with the audio data words stripped from it is the video signal. The audio data words from the detector/extractor circuit 14 are input to a first-in/first-out (FIFO) memory 16 during the EAV-SAV interval. The audio data words are clocked into the FIFO 16 at a video clock rate, such as 27 MHz. A microcontroller (uC) 18 takes the audio data words from the FIFO 16 together with the timing signals from the deserializer 12 and the enable signal from the detector/extractor 14, adds the proper audio format subframe header information, and serializes the audio data words. The serial audio data words are then passed to an audio transmitter 20 at audio sample rates, the transmitter encoding the data words according to the appropriate audio specification. The audio data words are clocked out at the audio sampling rate, such as 48 kHz, which is locked to the serial digital video input signal.

Figure 3:
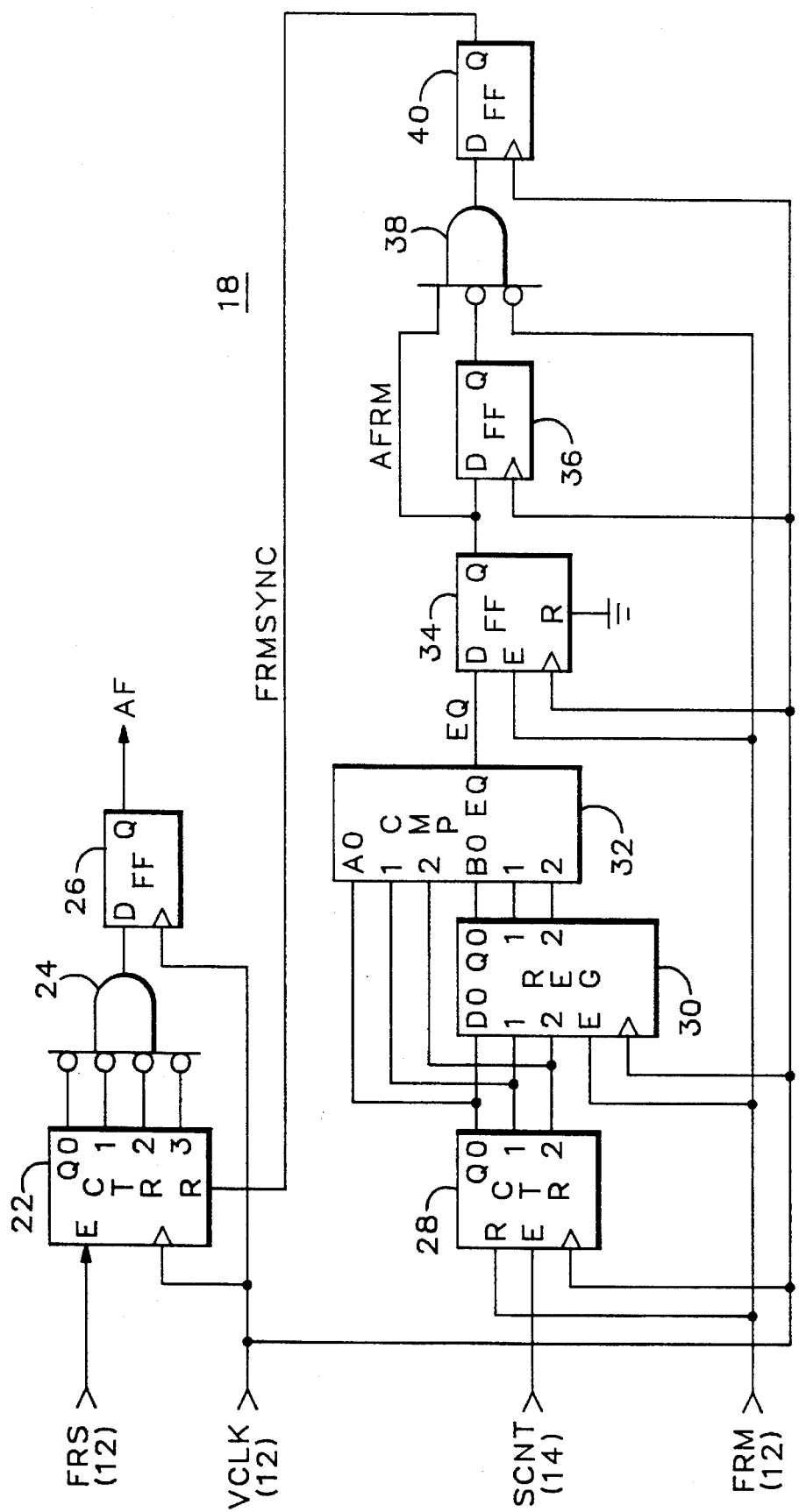
FIG. 3 is a block diagram for a specific implementation of a pattern detector for the demultiplexer according to the present invention.

The uC 18 performs the audio synchronization as shown in FIG. 3. A video field rate signal FRS, which is one of the timing signals from the deserializer 12, is input to a first counter 22 that is a recirculating counter from 0 to 2N−1, where N is the number of video frames per audio frame, i.e., N=5 in the current example. An AND gate 24 is coupled to the outputs of the first counter 22 to provide an audio frame signal AF when the counter recirculates to zero count. AF is latched into a first flip-flop 26, the output of which provides AF as the beginning of the audio frame sequence. A video clock signal VCLK, which is the video input sample rate from the deserializer 12 timing signals, causes the first counter 22 to increment when enabled by FRS, with FRS being only one video sample in duration and one of the deserializer timing signals. VCLK also latches the output from the AND gate 24 into the first flip-flop 26 so that AF has a duration equal to one video field. The leading edge of AF delineates the audio frame boundary.

Figure 4:
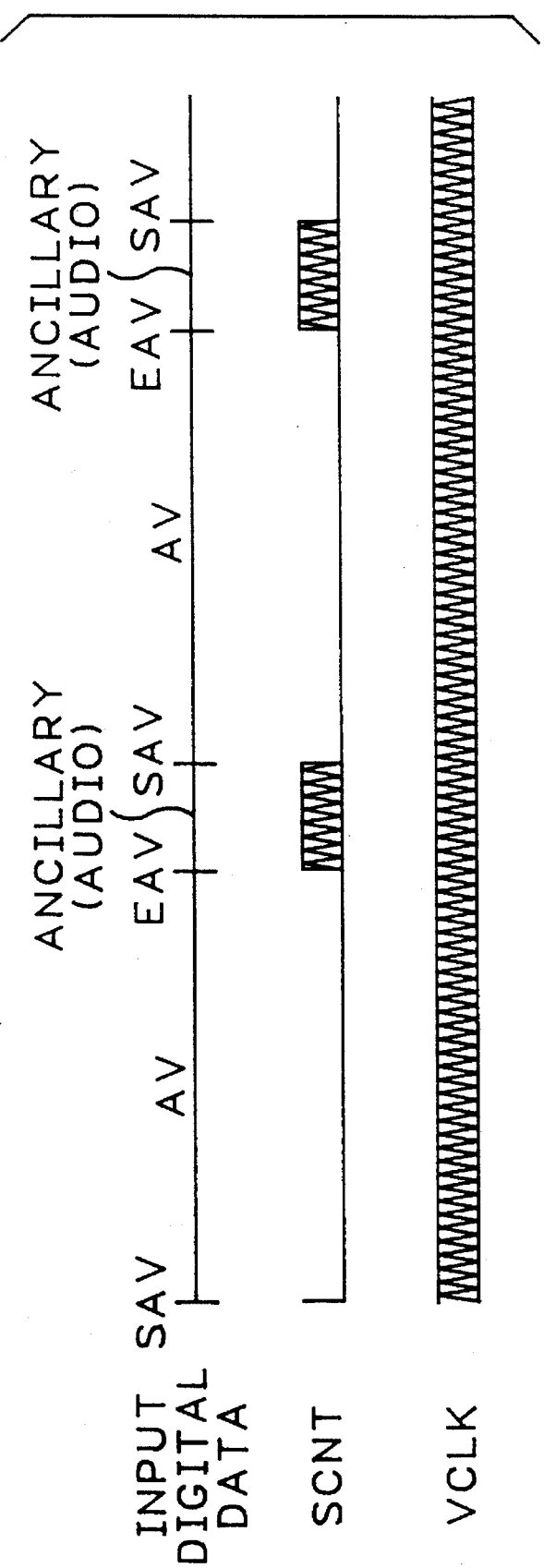
FIG. 4 is a timing diagram to illustrate the operation of the demultiplexer according to the present invention.

A sample counter signal SCNT, the enable signal from the detector/extractor 16, occurs during the interval between EAV and SAV as shown in FIG. 4, or during the horizontal and vertical intervals for composite video. SCNT enables a second recirculating counter 28 to clock the audio samples during the ancillary data interval at the VCLK rate. The second counter 28 is reset at the beginning of each video frame by a frame pulse signal FRM from the deserializer timing signals. FRM also enables a register 30 to store the least significant bits of the prior audio sample count from the second counter 28 at the end of the video frame. The outputs from the second counter 28 and the register 30 are input to a comparator circuit 32 that provides an equality output signal EQ, a logical "1", when the two quantities are equal. EQ is latched into a second flip-flop 34 by VCLK when enabled by FRM for one clock interval. The output of the second flip-flop 34 is an audio frame signal AFRM that indicates that two consecutive video fields have had an equal number of audio samples according to the present example, i.e., indicates that the audio sample pattern boundary for the video frames within an audio frame has been detected. A third flip-flop 36 and a second AND gate 38 act as a differentiator to provide a pulse output on the leading edge of AFRM. This pulse output is clocked into a fourth flip-flop 40 by VCLK to provide a reset signal FRMSYNC for the first counter 22 so that the output of the first counter is synchronized with the detected boundary of the audio frame to provide an accurate AF output signal.

Thus the present invention provides automatic audio frame synchronization for synchronizing embedded audio with video in a serial digital video demultiplexer by separating the audio from the video at video sample rates, detecting a boundary for an audio frame according to the audio samples per video frame within the audio frame, and outputting the audio samples at audio sample rates in the appropriate format synchronized with the video.

What is claimed is:

1. A method of audio frame synchronization for embedded audio demultiplexers comprising the steps of:

counting the number of audio samples in each video frame of a digital video signal;

detecting a pattern determined by the number of audio samples per video frame of the digital video signal within an audio frame; and generating a boundary signal for the audio frame when the pattern determined by the number of audio samples in each video frame is detected.

2. The method according to claim 1 wherein the detecting step comprises the step of comparing the number of audio samples between consecutive video frames, detecting the pattern when equality exists between the number of audio samples in consecutive video frames.

3. An apparatus for audio frame synchronization in embedded audio demultiplexers comprising:

means for generating an audio frame signal for every nth video frame of an input serial digital video signal, where n is determined by the respective video and audio standards for the input digital video signal;

means for detecting a pattern of audio samples per video frame of an audio frame that identifies a frame boundary for the audio frame; and means for initializing the generating means to provide the audio frame signal at the frame boundary determined by the detecting means.

4. The apparatus as recited in claim 3 wherein the generating means comprises:

means for counting the number of video frames in the input digital video signal in a recirculating manner between zero and n−1; and means for outputting the audio frame signal when the counting means has a specified count.

5. The apparatus as recited in claim 3 wherein the detecting means comprises:

means for counting the number of audio samples for each video frame of the input digital video signal; and a pattern detector for detecting the pattern over n video frames that represents the frame boundary.

6. The apparatus as recited in claim 5 wherein the pattern detector comprises:

means for storing the number of audio samples after each video frame; and means for comparing the number of audio samples from the counting means with the number of audio samples from the storing means after each video frame to generate an equality signal at the frame boundary when the number of audio samples in two consecutive video frames is equal.

7. The apparatus as recited in claim 4 wherein the initializing means comprises means for resetting the counting means to the specified count when the frame boundary is detected by the detecting means.

8. The apparatus as recited in claim 7 wherein the specified count is zero.

9. The apparatus as recited in claim 4 wherein the detecting means comprises:

means for counting the number of audio samples for each video frame of the input digital video signal; and a pattern detector for detecting the pattern over n video frames that represents the frame boundary.

10. The apparatus as recited in claim 9 wherein the pattern detector comprises:

means for storing the number of audio samples after each video frame; and means for comparing the number of audio samples from the counting means with the number of audio samples from the storing means after each video frame to generate an equality signal at the frame boundary when the number of audio samples in two consecutive video frames is equal.

11. The apparatus as recited in claim 10 wherein the initializing means comprises means for resetting the counting means to the specified count when the frame boundary is detected by the detecting means.

12. The apparatus as recited in claim 11 wherein the specified count is zero.

* * * * *